(12) United States Patent
Rinaldi (10) Patent No.: US 9,059,634 B2
(45) Date of Patent: Jun. 16, 2015

(54) ELECTRONIC SINE WAVE TRANSFORMER

(71) Applicant: Vito Rinaldi, Gormley (CA)

(72) Inventor: Vito Rinaldi, Gormley (CA)

(73) Assignee: Vito Rinaldi, Gormley, ON (CA)

( * ) Notice: Subject to any disclaimer, the term of this patent is extended or adjusted under 35 U.S.C. 154(b) by 237 days.

(21) Appl. No.: 13/849,025

(22) Filed: Mar. 22, 2013

(65) Prior Publication Data
US 2014/0286065 A1  Sep. 25, 2014

(51) Int. Cl.
*H01F 38/24* (2006.01)
*H02M 5/257* (2006.01)
*H02M 1/00* (2006.01)

(52) U.S. Cl.
CPC ...... *H02M 5/257* (2013.01); *H02M 2001/0064* (2013.01)

(58) Field of Classification Search
CPC ................................. H01F 38/00; H02M 5/12
USPC .............. 323/355, 358, 359; 336/15, 30, 137, 336/142; 363/170, 171
See application file for complete search history.

(56) References Cited

U.S. PATENT DOCUMENTS

| | | | |
|---|---|---|---|
| 5,162,982 A * | 11/1992 | Mentler | 363/26 |
| 2010/0201338 A1* | 8/2010 | Haj-Maharsi et al. | 323/305 |
| 2012/0236608 A1* | 9/2012 | Augesky | 363/44 |

\* cited by examiner

*Primary Examiner* — Matthew Nguyen
(74) *Attorney, Agent, or Firm* — Grant Tisdall; Gowling Lafleur Henderson LLP (57) ABSTRACT

There is provided an electronic sine wave transformer circuit configuration for transferring power from a source to a load using magnetic storage coupling, the circuit comprising: an input node adapted to receive an input alternating current power source having an input voltage operating at an input frequency in a Hertz range; the magnetic storage coupling unit comprising: a first set of windings coupled to a first switch, the first switch for receiving an input charging current associated with the input voltage; a second set of windings located in series or opposing connection with the first set of windings with a common magnetic path; a second switch connected at one end between the first and second set of windings and at another end to a common ground, the first and second switches having a switching frequency in a kilohertz range and switching between on and off in alternating modes; and an output node connected to the second set of windings, the output node adapted to provide an output AC power having a frequency of the input frequency to the load, the output power having an output voltage with an amplitude based on the input voltage and a voltage constant.

18 Claims, 5 Drawing Sheets

ELECTRONIC SINE WAVE TRANSFORMER

FIELD OF THE INVENTION

The present invention relates generally to an electronic sine wave transformer circuit and more particularly to a circuit for transferring alternating current (AC) power from a source to a load using magnetic storage coupling.

BACKGROUND OF THE INVENTION

Existing technologies that transfer power from a source to a load utilize converters that use capacitors as DC capacitive storage. Typically, DC capacitive storage systems have been used for size, and cost reasons. In such cases, the energy is stored within the capacitor as ½ $CV^2$. That is, generally speaking, the capacitor stores energy in the form of an electrical charge that produces a potential difference across the capacitor plates. One of the issues with such circuits is that they require rectification, direct wire connection, current pulses, DC regulator circuits for DC output, inverters to reproduce square wave outputs or more complex digital to analog power shapers to re-create AC sine waves and other such complexities. Additionally, such previous electronic converter circuits using DC capacitive storage typically receive an input alternating current (AC) signal and are converted to direct current (DC) to allow for the energy storage within the capacitor thereby outputting a DC signal to a load. This may not always be desirable as in most power transfer cases an AC output signal is desired because a large percentage of power (work) equipment is required to operate from AC sine wave sources and the larger the loads, the more pure (without power harmonic content) the source power is required. Usually this is only possible with direct line-load connections.

That is, existing converters change the input voltage to DC, store the energy in a capacitor and then use switching systems to convert to the desired output level. This requires input current control to minimize harmonics, rectifiers, storage capacitors, output filters. These are relatively complex systems and do not normally provide a clean sinusoidal output waveform (i.e. these systems have power harmonics and high frequency harmonics on the input and output).

It would be advantageous to provide a circuit for transferring power to a load from a source to transfer the energy such as to obviate or mitigate the disadvantages of capacitive storage solutions. Additionally, it would be advantageous to provide a circuit that allows an input AC to be output as an output DC signal without diode rectification and other associated re-construction steps.

SUMMARY OF THE INVENTION

According to one aspect, there is provided an electronic sine wave transformer circuit comprising an input node adapted to receive an input alternating current (AC) power source having an input voltage operating at an input frequency in a Hertz range; the magnetic storage coupling unit comprising: a first set of windings coupled to a first bi-directional AC switch, the first bi-directional AC switch for receiving an input charging current associated with the input voltage; a second set of windings located in series with the first set of windings, the first and second set of winding sharing a common core; a second bi-directional AC switch connected at one end between the first and second set of windings and at another end to a common ground, the first and second bi-directional AC switches having a switching frequency in a kilohertz range and switching between on and off in alternating modes; and an output node connected to the second set of windings, the output node adapted to provide an output AC power having a frequency of the input frequency, the output power having an output voltage with an amplitude based on the input voltage and at least one of: a winding ratio of the first and second set of windings, a polarity of the first and second set of windings and a duty cycle of the first and second bi-directional AC switches; wherein the magnetic storage unit is configured to receive said input power and transfer the input power between the input node to an output node such that the first set of windings and the second set of windings are configured to provide magnetic storage of energy based on each of the first and the second bi-directional AC switches being continuously switched.

In some aspects, the input AC power and the output AC power can be a sine wave. In other aspects the circuit can further comprising a capacitor located between the second set of windings and the common ground, the capacitor configured to suppress high frequency components in the kilohertz range of the output signal at the output node. In yet other aspects, the output voltage signal can be further dependent upon a turns ratio of the first set of windings relative to the second set of windings such that varying at least one of the turns ratio and the duty cycle directly varies the output voltage signal amplitude. In still other aspects, the circuit can provide a predefined constant ratio of voltage transfer from the input node to the output node. In yet another aspect, the circuit can provide a near zero power harmonic distortion in both the input and output power where the switching frequency is greater than about 100 times the input frequency. In yet still further aspects, the circuit can provide a harmonic correction for non-linear loads incrementally varying the duty cycle to correct for the anticipated fluctuations of said non-linear loads.

In yet another aspect, the circuit can comprise a second capacitor located between the first bi-directional switch and the common ground, the second capacitor configured to suppress high frequency current components at the input node. In a related aspect, the circuit can further comprise an input inductor located between the input node and the first bi-directional switch and an input capacitor located between the input node and the common ground, the input inductor cooperating with the input capacitor to provide additional suppression of high frequency components at the input node. In a further aspect, the input and output powers, voltages and currents have limited harmonic content other than the base power Hertz frequency content and the kilohertz high frequency components generated by the switching frequency are limited.

In some aspects, there can be a first duration where the first bi-directional AC switch is on and the second bi-directional switch is off, a current is permitted to flow from the first and second sets of windings to the load, the first and second sets of windings being magnetically charged for the first duration that the first bi-directional AC switch is closed. In a further aspect, there can be a second duration where the second bi-directional AC switch is on and the first bi-directional switch is off, the current ceases to flow at the first set of windings and the current at the load point is maintained by the second set of windings as it magnetically discharges. In still further aspect, the magnetic storage unit can be configured to maintain a constant output voltage ratio to the supply input voltage for the load during the switching operation of the first and the second bi-directional AC switch. In still a further aspect, the output voltage can be varied proportionally based on at least one of a turns ratio of the first set of windings relative to the second set of windings and the duty cycle.

In other aspects, the first and second switches can be operated at only certain durations of the Hertz frequency such that only a portion of the input voltage waveform is transferred to the load. In some aspects, the switching frequency of the first and second switches can be applied only during the positive phase or negative phase of the input voltage thus producing a positive or negative only controllable output voltage without a rectifier at the output node.

In yet other aspects, the input power source can be DC voltage and the first and second switches duty cycles are modulated at regular repeating Hertz rates with duty cycle variations so as to produce varying output voltages selected from: linear sinusoid voltages or non-linear outputs voltages to the load. In still other aspects, feedback can be used to control the duty cycle of the first and second bi-directional AC switches to provide a more stable output with respect to variations of input voltage.

BRIEF DESCRIPTION OF THE DRAWINGS

Embodiments of the present invention will now be described by way of example only with reference to the following drawings in which.

DETAILED DESCRIPTION OF THE PREFERRED EMBODIMENT

For convenience, like numerals in the description refer to like structures in the drawings. Referring to FIGS. 1A-1E generally, alternate circuit schematic arrangements are shown, in accordance with different embodiments, for an electronic sine wave transformer (hereinafter ESWT) circuit that allows the conversion or transfer of power from a source node to a load using magnetic storage coupling and high frequency pulses (provided by one or more switches) that are used to charge a magnetic storage unit comprised of one magnetically coupled core with multiple windings. That is, the magnetic storage of energy is handled by one core with multiple sets of windings that are coupled together and connected to one or more switches that provide the high frequency pulses to control the charging and discharging of the core and the sets of windings in the magnetic storage unit. Further, the magnetic storage coupling unit causes an input AC power and voltage to be transferred to the output (e.g. to a load) at a same operating frequency as the input power and voltage while using magnetic energy storage via a central storage core and a coupled number of sets of windings that are controlled by one or more switches.

Specifically, an input AC power supply provides an input supply voltage at a base frequency in a hertz range (e.g. under 400 Hz for typical line frequency) to a magnetic storage coupling unit. The magnetic storage coupling unit as will be described, is implemented in the form of a common core with one or more sets of windings and at least two bi-directional AC switches (e.g. a first and a second bidirectional switch) that are alternately turned on and off and supply high frequency magnetic pulses to the common core windings (shown having inductance Lc, Ld) and to the load. At least one of the switches is coupled to a first one of the sets of windings in series, while another one of the switches is coupled between the sets of windings and a common ground. Further, the first and second switch are switched in opposite modes (i.e. the first switch is on and the second switch is off, and vice versa) and the switching frequency is at much larger frequency (e.g. in a kilohertz range) than the base frequency of the input power supply (e.g. in a hertz range). In this manner, the first and second sets of windings (e.g. taken in combination) only see short charging pulses and also short discharging pulses between charging pulses.

That is, in one mode where the first switch is on (and the second switch is off), both the first and second sets of windings collectively get charged and store energy therein. In this case, the current flows through both the sets of windings and the total energy or magnetic flux stored is: $E=½ LI^2$. Where L refers to the inductance of the first and second sets of windings taken together and I is the magnetic charging current flowing therethrough.

In a second mode where the second switch is on (and the first switch is off), now the total current flows through only the second set of windings and thus the current is increased in order to maintain the magnetic flux at the start of the discharge pulse and then slowly decreases as energy is used to support load power. At an open circuit load condition, the charge current is in one polarity and the discharge current goes thru zero current and in the opposite direction so as to maintain a constant ratio of output voltage to input. That is, the output wave shape follows the sine wave input wave shape but the current alternates between one direction and the other to maintain zero net current flow.

Further, the magnetic storage coupling unit, allows the output voltage provided to the load to directly follow the shape of the input supply voltage. That is, if the input supply voltage is a sine wave with a particular base frequency, the output voltage supplied to the load is a sine wave with the same base frequency and a direct copy of the wave shape but at a proportional amplitude difference according to the ratio of the windings and the duty cycle of the electronic switches. The amplitude of the output voltage supplied to the load is a function of a voltage constant Kv and the input voltage supply amplitude. The relation is valid at the kilohertz frequency which is essentially instantaneous at the power hertz frequency of the input power and by extension is valid for the complete sine wave or any portion thereof, including truncating or re-starting of the switching at any part of the sine wave. The voltage constant Kv is further dependent on the turns ratio (a measure of the ratio of the number of turns of the sets of windings relative to one another) and the duty cycle. That is, since the turns ratio is fixed, the output voltage can be controlled by the duty cycle of the switching frequency of the first and second switches. Therefore, the voltage change between the input and output happens at the magnetic storage unit. The net result is that energy is stored at the set of windings and discharged to the load within the normal storage law of ½ LI^2. This means that the charge current slope is controlled by the charge voltage and Lc+Ld and the discharge slope is controlled by the output voltage and Ld only.

The end function of the ESWT is the somewhat the same as a conventional magnetic power transformer with an input winding and an output winding. As will be understood with reference to FIGS. 1A-1E for example, one of the differences of the ESWT circuit presented herein to existing transformer circuits is that in known transformer circuits having windings without the use of switching as proposed herein, the full voltage and current for each half cycle needs to be supported inductively by the transformer, this commonly referred to as the magnetizing inductance. Conversely, in the ESWT circuit discussed herein, the inductance (e.g. first and second sets of windings located in series) are charged for short pulses at a time (during the high switching frequency) and similarly discharge magnetically for short pulses. Additionally, in terms of size, existing transformer circuits can have a typical weight of around 100 lbs to accommodate the large magnetizing inductance, whereas the ESWT circuit presented herein has a significantly smaller size (e.g. 1 lb) and can be operated with a full sine wave input or any part of a sine or any other voltage source AC or DC.

In accordance with FIGS. 1A-1E, the ESWT circuit uses magnetic storage and is inherently bi-polar. That is, the energy can be stored in both polarities without any changes. Also, it can be transferred to the load in a half wave form. This is not possible with conventional transformers.

Further to expand on the advantages presented with the electronic sine wave transformer of FIGS. 1A-1E, A conventional transformer can be represented with an input leakage inductance, mutual inductance and output leakage inductance. All with the appropriate turns ratio applied. That is, the mutual inductance of the sets of windings in the circuit is the controlling element. At maximum working voltage the core flux is below saturation (i.e. typically 15 kGauss). The ampere-turns resulting from the applied voltage (at 50/60/400 Hertz) is such that the flux created by the volt-sec (area under one half sine) divided by the core area is less than saturation point of the core material. A typical multi-KVA transformer measures at 1 Henry with a weight of approx. 50-100 lb. with an included motorized control to allow variability. Preferably, the ESWT circuit of FIGS. 1A-1E charges and discharges the magnetic flux storage element with only sufficient flux to cover one high frequency cycle (kilohertz) to ferrite saturation levels that are typically 3 kGauss. In a preferred embodiment, the voltage transfer ratio works for sine waves and non-sinusoidal waveforms. Further preferably, the magnetic storage unit 100 presented in FIGS. 1A-1E weighs only 1 lb. Therefore there is material saving, cost and increased flexibility. The instantaneous and electronically variable nature of the transformer circuit of FIGS. 1A-1E allows control without any mechanical wear items.

As mentioned, the first and second switches of the magnetic storage unit have a switching frequency that can be orders of magnitude greater than the input frequency of the input power source. For example, preferably the switching frequency is in the kHz range and typically greater than 100 times the base power frequency which is in the hertz range. That is, there are no harmonics below the kHz range switching frequency. In this manner, power harmonics of the output power, provided at the output of the magnetic circuit that is being supplied to the load is minimized and for all practical purposes the power harmonics are eliminated. Additionally, the inductance sizes in the magnetic circuit and any capacitors used in the electronic sine wave transformer circuit for suppressing high frequencies above the hertz range are minimized.

It is further noted, that according to FIGS. 1A-1E, the electronic sine wave transformer circuit presented in FIGS. 1A-1E, receives an AC sine wave power and voltage at the input source at a first frequency and provides an AC sinewave power and voltage curve having the same shape as the input curve (e.g. at the first frequency) with a magnitude or amplitude of the output AC sinewave power and voltage being controlled by the fixed turns ratio of the sets of windings and the variable electronic timing of the switches in the magnetic storage unit (e.g. considering that the ratio of the turns of the first and second windings are kept constant). This is advantageous, as the ESWT circuit presented in FIGS. 1A-1E allows for the output power/voltage to be controlled electronically rather than using variable taps or motorized variable transformers. The circuit also provides a further advantage in that it allows controlling the output energy by storing it in the inductance of the windings (e.g. as magnetic charge) rather than capacitive storage which would require rectification and other such complexities. In addition because, the input power is an AC signal (e.g. sinewave) and the output power is an AC signal (e.g. sinewave of same frequency and shape as input signal) then the size, weight and conversion losses (e.g. due to conversion of the signal to DC and back to AC in existing DC capacitive storage system) is significantly reduced. This is an advantage not only over the conventional power transformer but also over capacitive storage switching power controllers.

Referring now to FIGS. 1A-1E, shown are exemplary embodiments of an electronic sine wave transformer circuit illustrated generally by reference numerals 101-105 according to alternate embodiments.

Figure 1A:
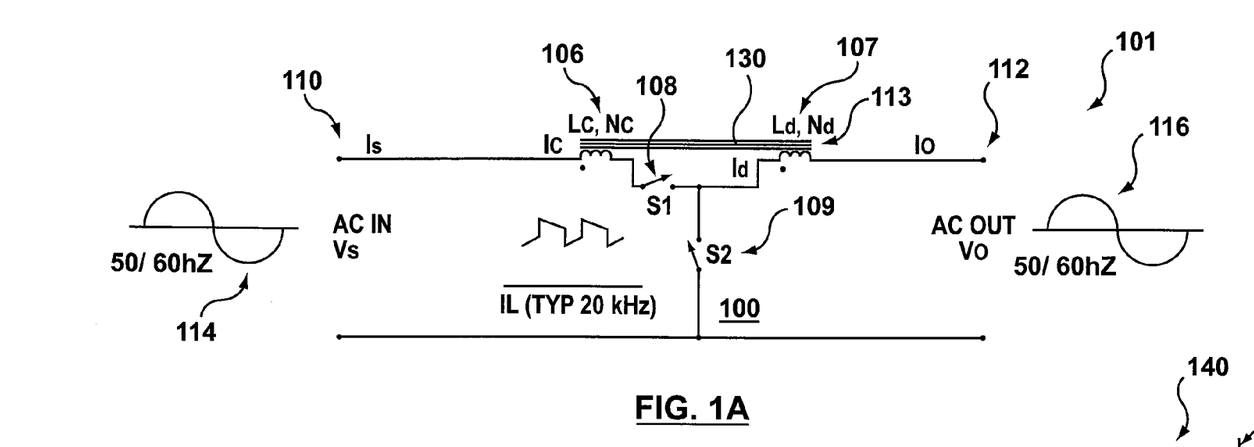
FIG. 1A is a schematic drawing of an electronic sine wave transformer circuit.

Referring to FIG. 1A, shown is the electronic sine wave transformer circuit 101. The electronic sine wave transformer circuit 101 comprises an input node 110, an output node 112 and a magnetic storage unit 100 coupled electrically between the input node 110 and the output node 112 connected to a load. The input node 110 is located at the source side for receiving an input AC (alternating current) power source having an input supply voltage 114 which operates at a low base frequency (e.g. at a line frequency, typically below 400 Hz). The magnetic storage unit 100 then serves to transform or transfer power from the source side to the load using high frequency magnetic energy storage. Magnetic storage unit 100 comprises a common core 130 having one or more sets of windings (e.g. a first set of windings 106 and a second set of windings 107) for storing energy magnetically within common core 130 (referred to as storage node 113). The magnetic storage unit 100 further comprises two or more switches (e.g. a first switch 108 and a second switch 109). The first and second switches 108-109 are AC bidirectional switches, illustrated generally at 140, that are switched on, alternately, that is opposite to one another and have a switching frequency in a kilohertz range (e.g. preferably orders of magnitude larger than the input power frequency).

Referring to the magnetic storage unit 100, the first set of windings 106 and second set of windings 107 are magnetically coupled together by common core 130. Preferably, the second set of windings 107 is located in series aiding or series opposing connection with the first set of windings 106 within a common magnetic path. Additionally, the first switch 108 is directly connected to the first set of windings 106 (and can be located on either side of first set of windings 106 as illustrated in the difference between FIGS. 1A and 1C). The second switch 109 is connected between the two set of windings 106, 107 and the common ground. The output node 112 is then connected to the second set of windings 107 such that the output node provides an output AC power having a frequency of the input base power frequency to the load, and an output voltage 116 operating at the base frequency. Further the amplitude or magnitude of the output voltage 116 is based on one or more of: a winding ratio between first and second sets of windings 106,107, a polarity of the first and second set of windings 106, 107 and the duty cycle of the switching frequency of the first and second switches 108, 109. As will be described, the magnetic storage unit 100 is configured to receive the input power and transfer it to the output node 112 such that the first and second set of windings 106, 107 provide magnetic storage of energy in a continuous fashion therein even while the first and second switches 108 and 109 are being alternately and in an opposing manner being switched on and off.

In one example, referring to FIG. 1A and the magnetic storage unit 100, the switch 108 and 109 duty cycle is set at a predefined number the set of windings 106, 107 are coupled together and each have a predefined number of windings. Referring to FIG. 1A, Nd refers to the number of windings to produce the inductance Ld of second set of windings 107, and Nc refers to the additional turns to produce the inductance Lc (referring to the combination of the first and second set of windings 106, 107). That is, Nc+Nd produces the inductance Lc+Ld. The inductance is proportional to the number of turns squared.

The following describes the general mode of operation of the magnetic storage unit referred to in each of FIGS. 1A-1E. In the first mode of operation, when the first switch 108 is switched on (and second switch 109 is switched off), the line current flows through the first and second sets of windings 106, 107 (storage node 113) to the load at output node 112. In this manner, the output current Io is equivalent to the input current Is which is equivalent to the current flowing through the set of windings Ic and Id. In this manner, the current flowing through the sets of windings 106, 107 supports the load current (Io) plus the magnetic charging current. That is, the combination of both sets of windings 106, 107 (storage node 113) preferably supports the desired peak output current To plus the peak charging current and the current flowing through the second set of windings 107 similarly must support the peak limits of the discharge current. That is, the magnetic energy flux (known as BH) load of the common core 130 of storage node 113 preferably does not reach saturation with the peak ampere-turns mentioned above.

Referring again to FIGS. 1A-1E, the input supply voltage 114, is preferably an AC sine wave operating at a base frequency (e.g. 50, 60 or 400 Hz), and the output voltage 116 at output node 112 is also an AC sine wave operating at the same base frequency (e.g. 50, 60 or 400 Hz). Preferably, referring to FIGS. 1A-1E, the switching frequency of switches within the magnetic storage unit 100 (e.g. the first switch 108 and the second switch 109) is much higher than the base frequency and in the kilohertz range (e.g. 20 kHz) while the base frequency is in the Hertz range (e.g. below 400 Hz). That is, as will be described, the magnetic storage unit 100, facilitates transforming a power AC voltage input to a power AC voltage output at the load by transforming or transferring the input energy using magnetic energy storage as the transfer medium.

Referring again to the first mode of operation, when the first switch 108 is switched on, the current flows through the first and second sets of windings 106, 107 (which are in series in this mode) to the load.

Generally speaking, the instantaneous output voltage at node 112, is defined as: $V_o = K_v V_s$ and the output current at node 112 is $$I_o = \frac{V_o}{Z_L}$$

where Kv is a predefined constant that is dependent on the turns ratio between the first and second sets of windings 106, 107 (e.g. specifically on the number of turns Nc of the first set of windings 106 relative to the number of turns Nd of the second set of windings 107). That is, $K_v$ is a function of the turns constant $K_i$ and the charge/discharge ratio $K_x$ as defined below. Further, the charge/discharge ratio is dependent upon delta-tc, the time to switch from the first switch 108 being switched on to the second switch 109 being switched on and delta-td which is the discharge time when the second switch 109 is on (first switch 108 is off).

This can be further understood as:

$$K_v = K_i \frac{\Delta t_c}{K_i \Delta t_c + \Delta t_d} = \frac{1}{\frac{1}{K_x} + 1}, \text{ constant for ratio of } V_0 \text{ to } V_s$$

Where $$K_x = \frac{\Delta t_c}{\Delta t_d} K_i$$

and $$K_i = \left(\frac{N_d}{N_c + N_d}\right), \text{ constant for ratio of } I_c(avg) \text{ to } I_d(avg).$$

As seen by the instantaneous values of the output voltage 116, a constant duty cycle will yield a constant output voltage 116 relative to the input voltage 114 and thereby transform an input sinewave to an output sinewave.

Figure 2:
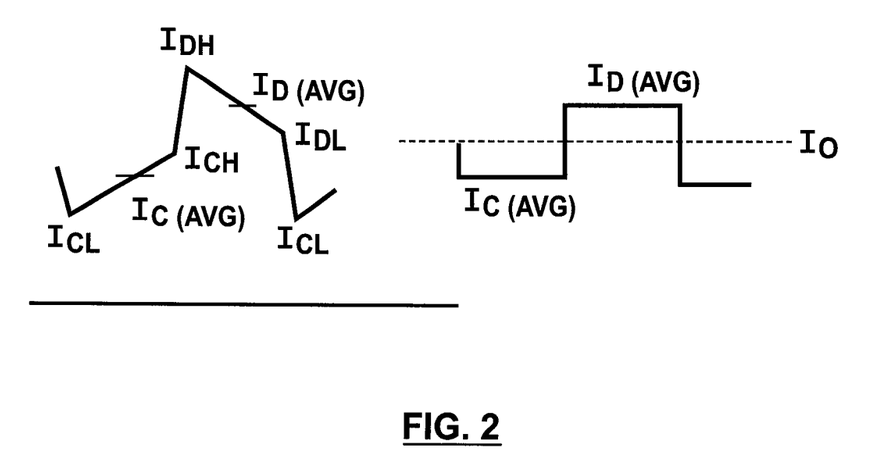
FIG. 2 is an illustration of the current waveform of the current through the storage set of windings and a current waveform illustrating the average current through the storage set of windings.

Referring now to the current waveform of FIG. 2 illustrating the current through the storage node 113. Further, in the first mode, the current flowing through the storage node 113 increases from Id to Ich while the first switch 108 is on and the second switch 109 is turned off. The current increase can be shown as follows:

$$I_{cl}(N_c + N_d) = I_{dl}N_d, I_{cl} = I_{dl}\left(\frac{N_d}{N_c + N_d}\right) = I_{dl}K_i$$

$$I_{ch}(N_c + N_d) = I_{dh}N_d, I_{ch} = I_{dh}\left(\frac{N_d}{N_c + N_d}\right) = I_{dh}K_i, K_i = \left(\frac{N_d}{N_c + N_d}\right)$$

$$\Delta I_c = I_{ch} - I_{cl} = (I_{ch} - I_{dl})K_i, \Delta I_c = \Delta I_d K_i$$

Subsequently, in the second mode, the first switch 108 is switched off and the second switch 107 is switched on, now all the current flows through the second set of windings 107 only, and the current instantly increases from Ich to Idh to maintain the conservation of energy in the magnetic field. That is, the current magnitude increases by the turns ratio difference. For example, in a scenario where Nc of set of windings 106 is equivalent to Nd of set of windings 107 then the current flowing through the second set of windings 107 increases to Idh (e.g. doubles in value compared to the current just before switch 108 is turned off in this case). Subsequently, during the following pre-defined discharge time interval while the second switch 107 is conducting, the current through the storage node 113 slowly decreases from Idh to Idl, the relation being shown above. Further, the current instantly decreases at the end of the discharge time interval when the second switch 109 is turned off and the first switch 108 is turned back on, from Idl to Icl.

As can be seen, a constant flux is maintained even during the time that each switch 108, 109 is turned on/off and during the transitions between modes. That is, the magnetic field and energy stored within the magnetic storage node 113 is kept constant during the switching modes from charge/discharge/charge.

The continuous storage of energy described in reference to the magnetic storage unit 100 of FIGS. 1A-1E refers to the fact that during the first and second mode of operations and switching therebetween (e.g. switching from the first switch 108 being turned on to the second switch 109 being turned on), the input-output voltage ratios (114 and 116) are maintained as the magnetic field and the energy stored within the storage node 113 remains constant as defined by E=½LI^2. That is, in a preferred embodiment, a constant ratio of voltage transfer from the source side to the load side is maintained irrespective of the input sine wave shape (e.g. input supply voltage 114) and the input sine wave shape of voltage 114 is converted at the fixed transfer ratio (e.g. determined as mentioned earlier by the Kv constant) to the load side as output voltage 116. The load impedance will thus determine the output current.

The mathematical relationships of voltages and currents used in FIGS. 1A-1E can be further understood as follows:

During the charge and discharge times, $V_s$ and $V_o$ remain essentially unchanged because the switching frequency is much greater than the line frequency (typically 20 kHz switching vs 60 Hz line). Therefore, the voltage and inductance of one of the sets of windings is given by:

$$V = L\frac{\Delta i}{\Delta t}, L = A_L N^2, A_L = \text{magnetic core inductance factor,}$$
$$N = \text{number of turns}$$

$V_s$ = instanteneous value of the 60 Hz input sine wave $V_o$ = instanteneous value of the 60 Hz output sine wave $$\Delta I_d = V_o \frac{\Delta t_d}{A_L N_d^2}$$

$$\Delta I_c = (V_s - V_o)\frac{\Delta t_c}{A_L(N_c + N_d)^2}$$

$$\Delta I_c = K_i \Delta I_d = K_i \frac{V_o \Delta t_d}{A_L N_d^2}$$

$$(V_s - V_o)\frac{\Delta t_c}{A_L(N_c + N_d)^2} = K_i \frac{V_o \Delta t_d}{A_L N_d^2}$$

$$(V_s - V_o)\frac{\Delta t_c}{A_L(N_c + N_d)^2}\frac{A_L N_d^2}{\Delta t_d} = (V_s - V_o)\frac{\Delta t_c}{\Delta t_d}K_i^2 = K_i V_o,$$

$$K_x = \frac{\Delta t_c}{\Delta t_d}K_i$$

$$K_x(V_s - V_o) = V_o$$

$$V_o(1 + K_x) = K_x V_s$$

$$V_o = \frac{K_x}{1+K_x}V_s = \frac{1}{\frac{1}{K_x}+1}V_s = K_v V_s, K_v = \frac{1}{\frac{1}{K_x}+1}$$

Note that $K_v$ is a only a function of the turns constant $K_i$ and the duty cycle $K_x$ $$\Delta I_d = V_o\frac{\Delta t_d}{A_L N_d^2} = K_v V_s\frac{\Delta t_d}{A_L N_d^2} = K_D V_s,$$

$$K_d = \frac{K_v \Delta t_d}{A_L N_d^2}, \Delta I_c = \Delta I_d K_i = K_i K_d V_s$$

Note that the current ripple magnitude in the storage element 113 is a function of $V_s$, the inductance values and the duty cycle.

The constants are:

$$K_i = \left(\frac{N_d}{N_c + N_d}\right), \text{constant for ratio of } I_c(avg) \text{ to } I_d(avg)$$

$$K_o = \frac{\Delta t_c + \Delta t_d}{K_i \Delta t_c + \Delta t_d}, \text{constant for ratio of } I_o \text{ to } I_c(avg), I_d(avg)$$

$$K_x = \frac{\Delta t_c}{\Delta t_d}K_i$$

$$K_v = K_i\frac{\Delta t_c}{K_i \Delta t_c + \Delta t_d} = \frac{1}{\frac{1}{K_x}+1}, \text{constant for ratio of } V_0 \text{ to } V_s$$

$$K_d = \frac{K_v \Delta t_d}{A_L N_d^2}, \text{constant for ratio of ripple } \Delta I_c, \Delta I_d$$

The following are the simplified working relations:

$$V_o = K_v V_s$$
$$\Delta I_d = K_d V_s$$
$$\Delta I_c = K_i K_d V_s$$
$$I_o = \frac{V_o}{Z_L}$$
$$I_d(avg) = K_o I_o$$
$$I_c(avg) = K_i K_o I_o$$
$$D = \frac{\Delta t_c}{\Delta t_c + \Delta t_d}, \text{duty cycle}$$
$$I_s = DI_c(avg) = DK_i K_o I_o$$
$$DK_i K_o = \frac{\Delta t_c}{\Delta t_c + \Delta t_d}K_i\frac{\Delta t_c + \Delta t_d}{K_i \Delta t_c + \Delta t_d} = K_v$$
$$V_s I_s = \frac{1}{K_v}V_o K_v I_o = V_o I_o$$

Further, the values for currents flowing through the transformer circuits of 101-105 can be calculated as follows:

$$I_c(avg) = \frac{I_{ch} + I_{cl}}{2} = \frac{I_{dh} + I_{dl}}{2}K_i = I_d(avg)K_i$$

$$\Delta I_c = I_{ch} - I_{cl} = (I_{dh} - I_{dl})K_i, \Delta I_c = \Delta I_d K_i$$

-continued $$I_o = \frac{I_c(avg)\Delta t_c + I_d(avg)\Delta t_d}{\Delta t_c + \Delta t_d} =$$

$$\frac{K_i I_d(avg)\Delta t_c + I_d(avg)\Delta t_d}{\Delta t_c + \Delta t_d} = I_d(avg)\frac{K_i\Delta t_c + \Delta t_d}{\Delta t_c + \Delta t_d}$$

$$I_d(avg) = K_o I_o, K_o = \frac{\Delta t_c + \Delta t_d}{K_i\Delta t_c + \Delta t_d}$$

Note that $I_c(avg), I_d(avg)$ are a function of the load current, duty cycle and the number of turns of the storage set of windings.

$$I_o = \frac{V_o}{Z_L}, Z_L = \text{load impedance}$$

It is noted that the operation of the magnetic storage unit 100 described in reference to FIG. 1A applies similarly to FIGS. 1B-1E.

Figure 1B:
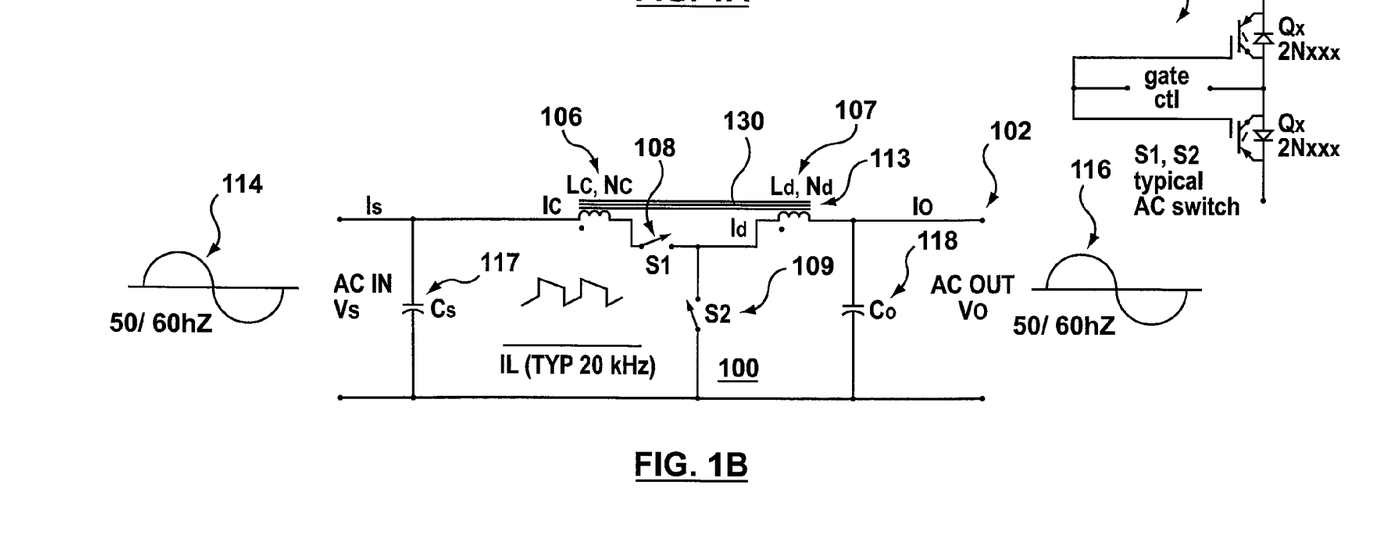
FIG. 1B is a schematic drawing of an electronic sine wave transformer circuit according to another embodiment.
Figure 1C:
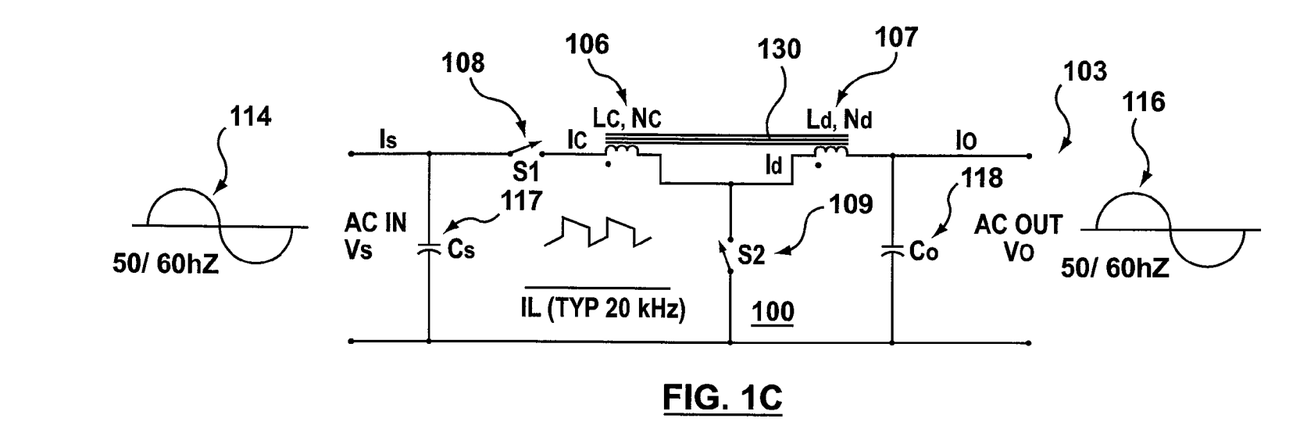
FIG. 1C is a schematic drawing of an electronic sine wave transformer circuit according to another embodiment.

In one embodiment referring to FIGS. 1B and 1C, shown is an electronic sine wave transformer 102, 103 according to alternate embodiments where an input capacitor 117 located between the first switch 108 and/or the first set of windings 106 and the common ground. The input capacitor 117 is configured for cooperating with both the first and second sets of windings 106, 107 to suppress the high frequency current components in the kilohertz range from the input supply side of the ESWT circuit 102, 103 respectively. Further, there is provided an output capacitor 118, located between the second set of windings 107 and the common ground (e.g. across the load), the output capacitor 118 configured for cooperating with the first and second sets of windings 106, 107 to suppress the high frequency components in the kilohertz range (e.g. generated by the high frequency switching rate of the first and second switches 108, 109) of the output power/voltage at the output node.

Figure 1D:
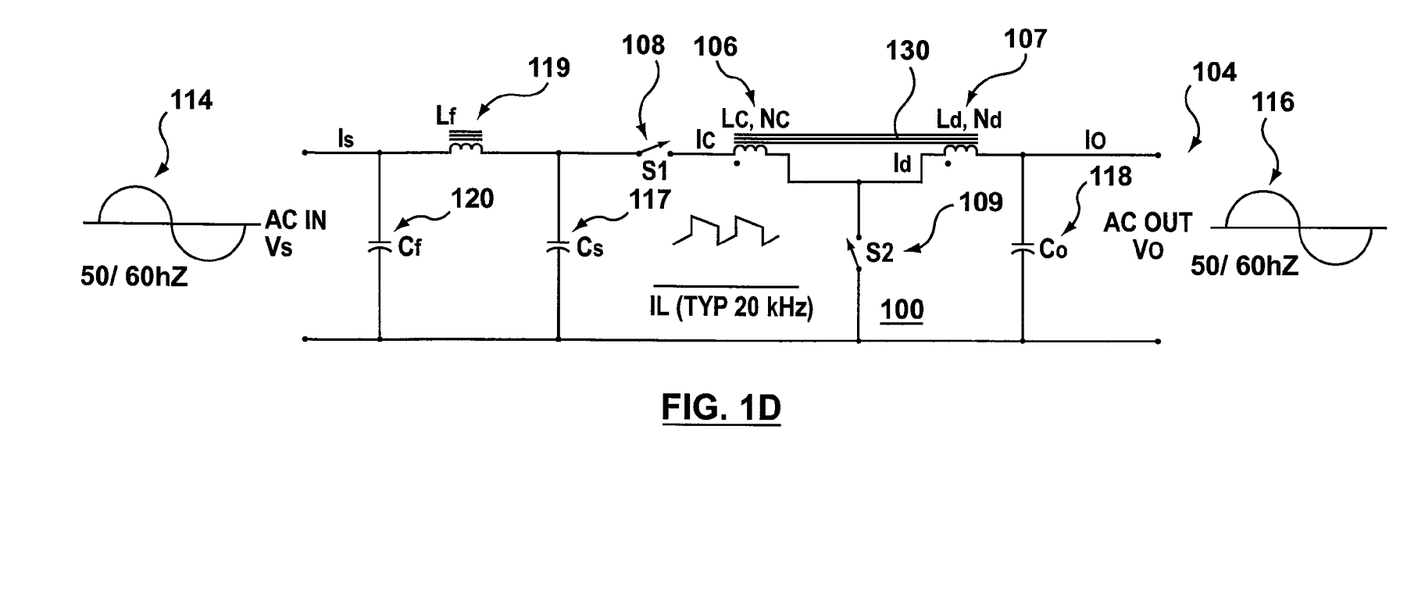
FIG. 1D is a schematic drawing of an electronic sine wave transformer circuit according to another embodiment.
Figure 1E:
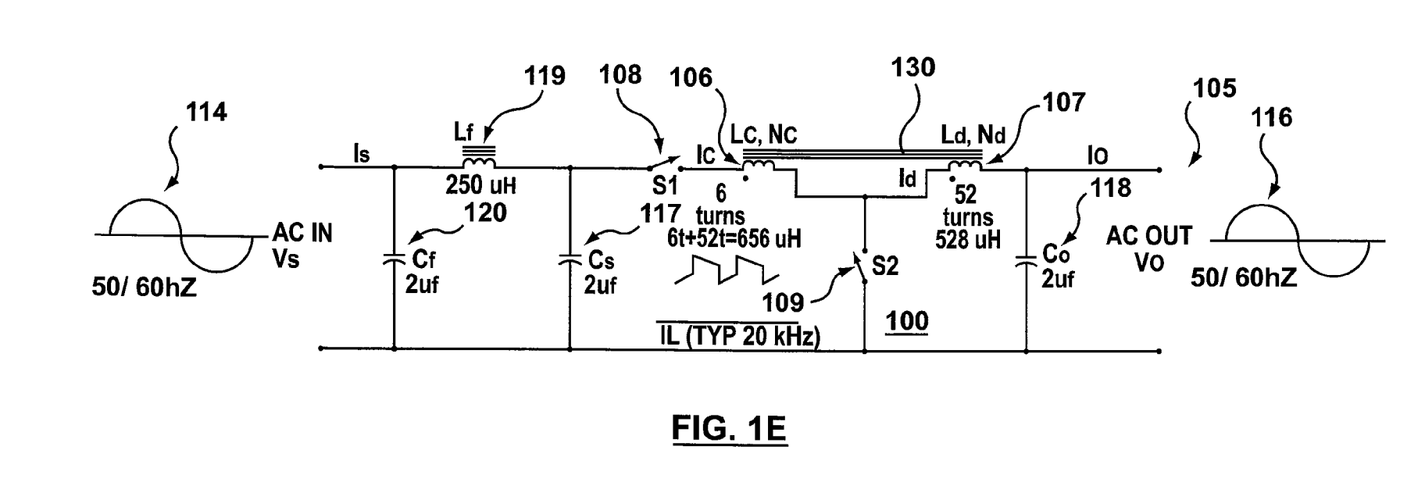
FIG. 1E is schematic drawing of an electronic sine wave transformer circuit according to another embodiment.

In yet another embodiment referring to FIG. 1D, there is provided an input inductor 119 located between the input node and the first switch 108 and a filtering capacitor 120 located between the input node and the common ground. The input inductor 119 cooperating with the input capacitor 120 to provide additional suppression of high frequency components from the input signal (e.g. 114) provided to the magnetic storage unit 100. FIG. 1E provides some exemplary values for the components to filter the appropriate frequencies in a line frequency embodiment.

In a preferred embodiment of FIGS. 1A-1E, the input and output powers, voltages and currents have no harmonic content other than the base input frequency (Hertz frequency) content, including the absence of the kilohertz high frequency component.

In yet another embodiment (not illustrated), the first and second switches 108, 109) are operated at only certain portions of input waveform of the input supply voltage 114 such that only a portion of the input voltage 114 waveform is transferred to the load as output voltage 116.

Figure 3A:
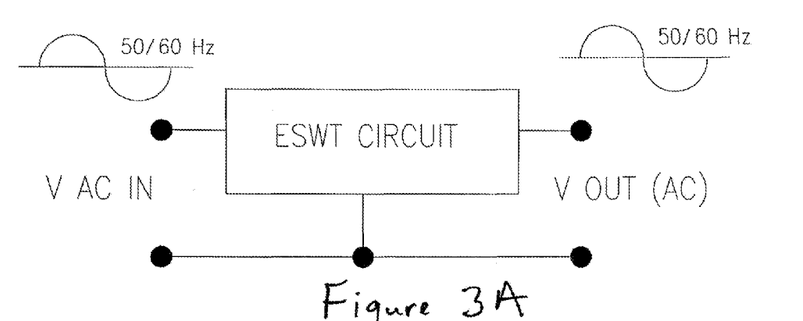
FIG. 3A is a block diagram of the electronic sine wave transformer circuit of FIGS. 1A-1E.
Figure 3B:
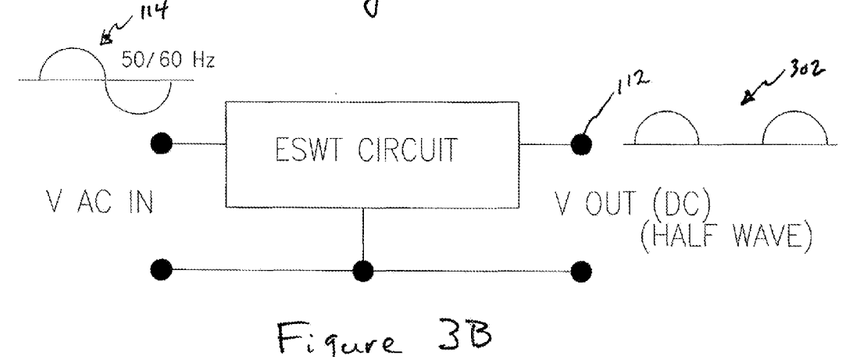
FIG. 3B is a block diagram of the electronic sine wave transformer circuit of FIG. 3A showing a half-wave rectification.

In yet another embodiment, the switching frequency of the first and second switches 108, 109 is only applied during the positive phase or negative phase of the input voltage thus producing a positive or negative only controllable output voltage commonly referred to as half wave rectification, without the use of a diode or rectifier at the output. For example, in FIG. 3B, first and second switches 108, 109 can be operated in the positive half-cycle of the input voltage 114 waveform to provide only the positive waveform 302 to the output node 112.

Figure 3C:
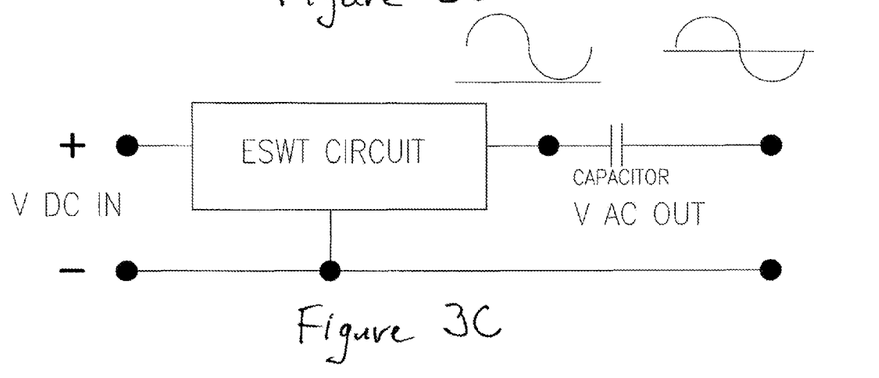
FIG. 3C is a block diagram of the electronic sine wave transformer circuit of FIG. 3A showing an inverter to recreate an AC waveform using duty cycle modulations.

In yet another embodiment illustrated in FIG. 3C, the input power source (e.g. 114) can be a DC voltage and the switches 108, 109 duty cycles are modulated at regular repeating variations so as to produce varying output voltages 116 which are selected from linear sinusoid voltages or non-linear output voltages to the load.

In yet another aspect of the ESWT 101-105 of FIGS. 1A-1E, it is noted that the ripple currents (shown as delta Ic) are not affected by the load current Io. That is, when the load is disconnected such as to cause a zero load current, there will only be the ripple current component above and below zero at the high frequency. The output voltage 116 will still be defined by the ratio to the input voltage 114 defined above.

In some embodiments, a feedback circuit can be used to monitor output waveform 116 that is used to alter the duty cycle of the switches 108,109 to provide a more stable output voltage with respect to the input voltage.

Accordingly, it will be appreciated by a person of ordinary skill in the art that the present invention provides improved flexibility for the electronic sine wave transformer circuits by allowing electronic timing switching controls of the output voltage provided to a load and allowing an AC input power to be supplied as an output AC power such that the amplitude is dependent upon the turns ratio between the sets of windings and the duty cycle of the switches used in the magnetic storage unit 100 described herein. Therefore there is material saving, cost and increased flexibility. The electronics variable nature of the transformer circuit 101-105 allows control of output voltage, power and current without any mechanical wear items.

Further, although the invention has been described with reference to certain specific embodiments, various modifications thereof will be apparent to those skilled in the art without departing from the scope of the invention as defined by the appended claims.

What is claimed is:

1. An electronic sine wave transformer circuit comprising:
   an input node adapted to receive an input alternating current (AC) power source having an input voltage operating at an input frequency in a Hertz range;
   the magnetic storage coupling unit comprising:
      a first set of windings coupled to a first bi-directional AC switch, the first bi-directional AC switch for receiving an input charging current associated with the input voltage;
      a second set of windings located in series with the first set of windings, the first and second set of winding sharing a common core;
      a second bi-directional AC switch connected at one end between the first and second set of windings and at another end to a common ground, the first and second bi-directional AC switches having a switching frequency in a kilohertz range and switching between on and off in alternating modes; and
   an output node connected to the second set of windings, the output node adapted to provide an output AC power having a frequency of the input frequency, the output power having an output voltage with an amplitude based on the input voltage and at least one of: a winding ratio of the first and second set of windings, a polarity of the first and second set of windings and a duty cycle of the first and second bi-directional AC switches;
   wherein the magnetic storage unit is configured to receive said input power and transfer the input power between the input node to an output node such that the first set of windings and the second set of windings are configured to provide magnetic storage of energy based on each of the first and the second bi-directional AC switches being continuously switched.

2. The circuit configuration of claim 1, wherein the input AC power and the output AC power is a sine wave.

3. The circuit configuration of claim 2 further comprising a capacitor located between the second set of windings and the common ground, the capacitor configured to suppress high frequency components in the kilohertz range of the output signal at the output node.

4. The circuit configuration of claim 2, wherein the output voltage signal is further dependent upon a turns ratio of the first set of windings relative to the second set of windings such that varying at least one of the turns ratio and the duty cycle directly varies the output voltage signal amplitude.

5. The circuit configuration of claim 2 providing a predefined constant ratio of voltage transfer from the input node to the output node, irrespective of the input wave shape, the input wave shape being converted at the predefined transfer ratio to the load.

6. The circuit of claim 2 further providing a near zero power harmonic distortion in both the input and output power, voltage and currents with a fixed duty cycle wherein the switching frequency is greater than about 100 times the input frequency such that no harmonics are present below the kilohertz switching frequency.

7. The circuit of claim 2 further providing a harmonic correction for non-linear loads when the duty cycle is incrementally varied during the sine wave so as to correct for the anticipated fluctuations of said non-linear loads.

8. The circuit configuration of claim 3 further comprising a second capacitor located between the first bi-directional switch and the common ground, the second capacitor configured to suppress high frequency current components at the input node.

9. The circuit configuration of claim 8 further comprising an input inductor located between the input node and the first bi-directional switch and an input capacitor located between the input node and the common ground, the input inductor cooperating with the input capacitor to provide additional suppression of high frequency components at the input node.

10. The circuit of claim 9 wherein the input and output powers, voltages and currents have limited harmonic content other than the base power Hertz frequency content and the kilohertz high frequency component generated by the switching frequency are limited.

11. The circuit configuration of claim 2, wherein for a first duration where the first bi-directional AC switch is on and the second bi-directional switch is off, a current is permitted to flow from the first and second sets of windings to the load, the first and second sets of windings being magnetically charged for the first duration that the first bi-directional AC switch is closed.

12. The circuit configuration of claim 11, wherein during a second duration where the second bi-directional AC switch is on and the first bi-directional switch is off, the current ceases to flow at the first set of windings and the current at the load point is maintained by the second set of windings as it magnetically discharges.

13. The circuit configuration of claim 12, wherein the magnetic storage unit is configured to maintain a constant output voltage ratio to the supply input voltage for the load during the switching operation of the first and the second bi-directional AC switch.

14. The circuit configuration of claim 13, wherein the output voltage is varied proportionally based on at least one of a turns ratio of the first set of windings relative to the second set of windings and the duty cycle.

15. The circuit of claim 2 such that the first and second switches are operated at only certain durations of the Hertz frequency such that only a portion of the input voltage waveform is transferred to the load.

16. The circuit of claim 15 such that the switching frequency of the first and second switches is applied only during the positive phase or negative phase of the input voltage thus producing a positive or negative only controllable output voltage without a rectifier at the output node.

17. The circuit of claim 2 whereby the input power source is a DC voltage and the first and second switches duty cycles are modulated at regular repeating Hertz rates with duty cycle variations so as to produce varying output voltages selected from: linear sinusoid voltages or non-linear outputs voltages to the load.

18. The circuit of claim 2 whereby feedback is used to control the duty cycle of the first and second bi-directional AC switches to provide a more stable output with respect to variations of input voltage.

* * * * *